US008555245B2

(12) United States Patent
Bouz et al.

(10) Patent No.: US 8,555,245 B2
(45) Date of Patent: Oct. 8, 2013

(54) AUTOMATED APPLICATION GENERATION METHOD AND SYSTEM

(75) Inventors: Firas Bouz, Lexington, KY (US); Anne Marie Brinkman, Mountain View, CA (US); Douglas Stuart Brown, Charlotte, NC (US); William Michael Higginbotham, Johnson City, TN (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/701,064

(22) Filed: Feb. 5, 2010

(65) Prior Publication Data

US 2011/0197175 A1 Aug. 11, 2011

(51) Int. Cl.
*G06F 9/44* (2006.01)
(52) U.S. Cl.
USPC ............ 717/115; 717/106; 717/110; 717/122
(58) Field of Classification Search
USPC .................................................. 717/106–122
See application file for complete search history.

(56) References Cited

U.S. PATENT DOCUMENTS

| 7,139,999 | B2 * | 11/2006 | Bowman-Amuah | 717/101 |
|---|---|---|---|---|
| 7,437,712 | B1 | 10/2008 | Brown et al. | |
| 7,809,763 | B2 * | 10/2010 | Nori et al. | 707/802 |
| 2006/0236301 | A1 | 10/2006 | Minium et al. | |

OTHER PUBLICATIONS

Jim Gentilin; Dr. Dobb's Journal; A Build Incrementing Utility; Sep. 1, 2000; URL:http://www.ddj.com/windows/184416263; 12 pages.

* cited by examiner

*Primary Examiner* — Chuck Kendall
(74) *Attorney, Agent, or Firm* — Schmeiser, Olsen & Watts; Anna Linne; Matthew Chung

(57) ABSTRACT

A modification method and system. The method includes retrieving by a computer processor of a computing system a list of features and plug-ins associated with an application. The features include features version metadata and the plug-ins include plug-ins version metadata. The computer processor compares features source code associated with the features with previous versions of associated source code. The computer processor generates modified features version metadata associated with the features version metadata. The modified features version metadata includes updated version labels differing from previous version labels of the previous versions of associated source code. The features are assembled into an application.

20 Claims, 4 Drawing Sheets

AUTOMATED APPLICATION GENERATION METHOD AND SYSTEM

FIELD OF THE INVENTION

The present invention relates to a method and associated system for automatically generating a software application.

BACKGROUND OF THE INVENTION

Constructing systems comprising aggregated components typically comprises an inefficient process with little flexibility. Each aggregated component typically comprises varying characteristics. Varying characteristics may result in an incorrect selection of a component.

SUMMARY OF THE INVENTION

The present invention provides a method comprising:
retrieving, by a computer processor of a computing system, a list of features and plug-ins associated with an application, wherein said features comprise features version metadata, and wherein said plug-ins comprise plug-ins version metadata;
generating, by said computer processor, a first fetch script for a first application feature of said list of features;
generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;
enabling, by said computer processor, said first modified fetch script to retrieve said first source files;
copying, by said computer processor, said source files to a build directory; retrieving, by said computer processor, framework components comprised by a framework associated with said application;
generating, by said computer processor, a first group of fetch scripts associated with said framework components and said features from said list of features;
generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;
enabling, by said computer processor, said first group of modified fetch scripts to retrieve said group of source files;
comparing, by said computer processor, features source code associated with said features with previous versions of associated source code;
generating, by said computer processor based on results of said comparing said features source code, modified features version metadata associated with said features version metadata, wherein said modified features version metadata comprises updated version labels differing from previous version labels of said previous versions of associated source code;
generating, by said computer processor, commit scripts for a group of source code of said features source code, wherein said group of source code comprises source code that differs from said associated source code;
assembling, by said computer processor, said features into said application; and placing, by said computer processor, said features assembled into said application into a compressed file.

The present invention provides a computing system comprising a computer processor coupled to a computer-readable memory unit, said memory unit comprising instructions that when enabled by the computer processor implement a modification method, said method comprising:
retrieving, by said computer processor, a list of features and plug-ins associated with an application, wherein said features comprise features version metadata, and wherein said plug-ins comprise plug-ins version metadata;
generating, by said computer processor, a first fetch script for a first application feature of said list of features;
generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;
enabling, by said computer processor, said first modified fetch script to retrieve said first source files;
copying, by said computer processor, said source files to a build directory;
retrieving, by said computer processor, framework components comprised by a framework associated with said application;
generating, by said computer processor, a first group of fetch scripts associated with said framework components and said features from said list of features;
generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;
enabling, by said computer processor, said first group of modified fetch scripts to retrieve said group of source files;
comparing, by said computer processor, features source code associated with said features with previous versions of associated source code;
generating, by said computer processor based on results of said comparing said features source code, modified features version metadata associated with said features version metadata, wherein said modified features version metadata comprises updated version labels differing from previous version labels of said previous versions of associated source code;
generating, by said computer processor, commit scripts for a group of source code of said features source code, wherein said group of source code comprises source code that differs from said associated source code;
assembling, by said computer processor, said features into said application; and
placing, by said computer processor, said features assembled into said application into a compressed file.

The present invention provides a computer program product, comprising a computer readable medium comprising a computer readable program code embodied therein, said computer readable program code adapted to implement a modification method within a computing system comprising a computer processor, said method comprising:
retrieving, by said computer processor, a list of features and plug-ins associated with an application, wherein said features comprise features version metadata, and wherein said plug-ins comprise plug-ins version metadata;
generating, by said computer processor, a first fetch script for a first application feature of said list of features;
generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;

enabling, by said computer processor, said first modified fetch script to retrieve said first source files;

copying, by said computer processor, said source files to a build directory;

retrieving, by said computer processor, framework components comprised by a framework associated with said application;

generating, by said computer processor, a first group of fetch scripts associated with said framework components and said features from said list of features;

generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;

enabling, by said computer processor, said first group of modified fetch scripts to retrieve said group of source files;

comparing, by said computer processor, features source code associated with said features with previous versions of associated source code;

generating, by said computer processor based on results of said comparing said features source code, modified features version metadata associated with said features version metadata, wherein said modified features version metadata comprises updated version labels differing from previous version labels of said previous versions of associated source code;

generating, by said computer processor, commit scripts for a group of source code of said features source code, wherein said group of source code comprises source code that differs from said associated source code;

assembling, by said computer processor, said features into said application; and placing, by said computer processor, said features assembled into said application into a compressed file.

The present invention advantageously provides a simple method and associated system capable of constructing systems comprising aggregated components.

BRIEF DESCRIPTION OF THE DRAWINGS

FIG. 2 including FIGS. 2A and 2B illustrates a flowchart describing an algorithm used by the system of FIG. 1 for automatically generating a software application and modifying versions associated with features and plug-ins of the software application, in accordance with embodiments of the present invention.

DETAILED DESCRIPTION OF THE INVENTION

Figure 1:
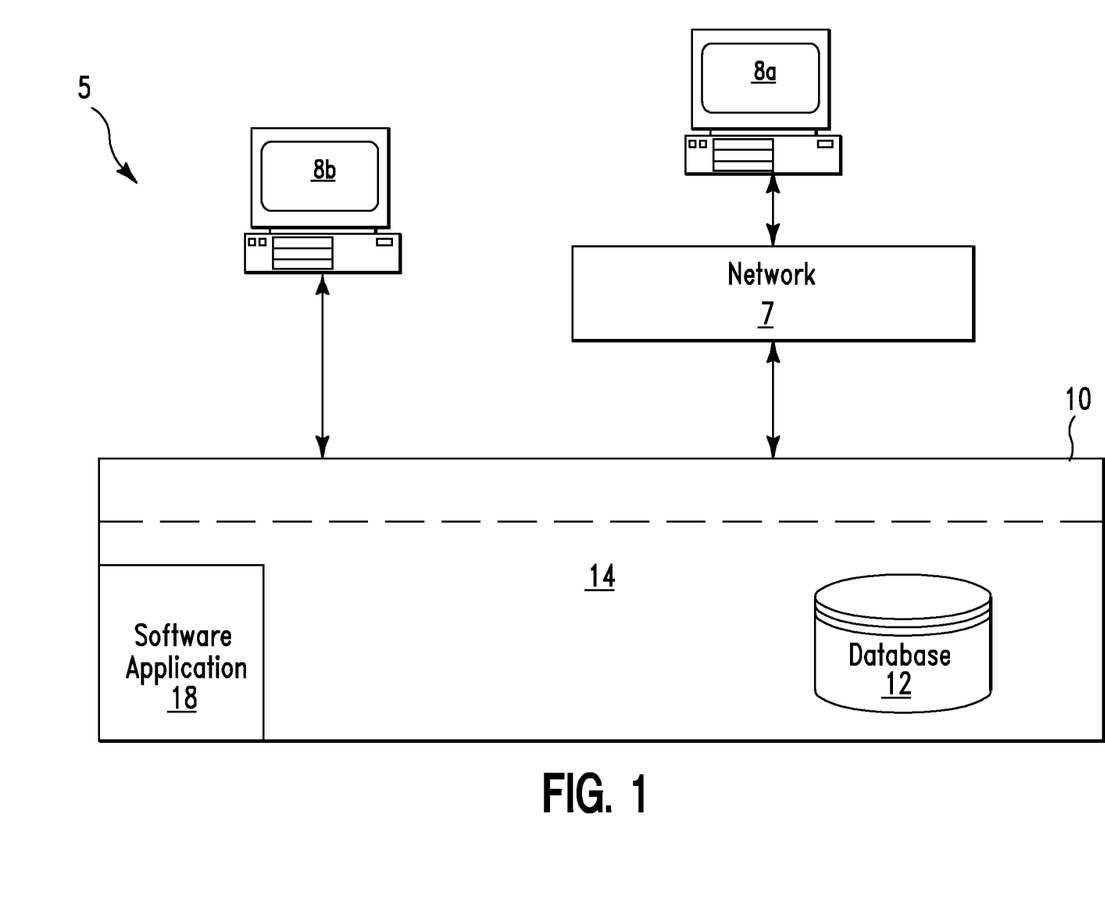
FIG. 1 illustrates a system for automatically generating a software application, in accordance with embodiments of the present invention.

FIG. 1 illustrates a system 5 for automatically generating a software application, in accordance with embodiments of the present invention. System 5 comprises a smart automated build mechanism that enables a process for creating a configuration specific application installer and update executables. The process includes:

1. Automatically downloading source code from a source code repository (SCR).
2. Comparing the source code to a previous build to determine changes.
3. Automatically incrementing version information and updating/committing version changes of the source code back to the SCR upon success of an application build.

System 5 enables a smart infrastructure process for the automated build of software applications (e.g., a client software application) including all components of the software application. Components of a software application may include, inter alia, features, plug-ins, packages, class files, etc. A class file is defined herein as compiled source files. A package is defined herein as multiple aggregated class files. A plug-in is defined herein as multiple aggregated packages. A feature is defined herein as multiple aggregated plug-ins. The smart infrastructure process for the automated build of software applications may result in executable files for application delivery, installation, and update. The smart infrastructure process for the automated build of software applications may include, inter alia:

1. Downloading associated source code from a SCR.
2. Determining product features/plug-ins that have changed since a previous software application build.
3. Incrementing associated version information for each changed plug-in.
4. Determining features that are affected by the changed plug-ins and incrementing the feature version information.
5. Generating programmatic scripts used to commit the version information changes to an associated SCR.
6. Updating required version display information in the software application to display a new build version and build increment information for an end user.
7. Compiling and packaging each plug-in and feature for application delivery.
8. Associating features and plug-ins with a launch configuration unique to a delivery configuration (e.g., different operating systems).
9. Building launch configuration, features, and plug-ins into installation and update delivery applications (e.g., Installer.exe and Update.exe).
10. Calculating MD5 checksums for generated installation and update delivery applications used to verify the integrity of a delivered installer and updater.
11. Committing/updating to the SCR regarding any changes made to the source code for version or build information display.

The process for building a software application may be divided into multiple build stages as follows:

1. Preparation stage including deleting any previous build related folders and recreating empty sub-folders needed by the build process.
2. Mapping stage including downloading a generic map and converting the map to use an SCR user id associated with a configuration properties file (i.e., if secure SCR is being used).
3. Seed build with product feature stage including generating a fetch script for a software application feature from map information and modifying the generated script to redirect files to a source folder. Additionally, the script may be modified to checkout with SCR version information included. All software application feature components are downloaded and copied files to a build folder.
4. Fetch script generation and download stage including generating fetch scripts for each component required by the software application based on information from the map. Each script is converted to redirect files to a source folder and checkout with SCR version information included. All components are downloaded for each generated script.

5. Difference and versioning stage including comparing each plug-in with a version in the SCR used in a previous build (if available) and if any changes are noted, version metadata inside the plug-ins are incremented. The plug-in identifier is added to a collection of changed plug-ins. Each associated feature for each changed plug-in is determined and version meta-data for each feature that has changed plug-ins is incremented. User visible version and build information in associated plug-ins (e.g., about.mappings files) is updated. Qualifiers are automatically generated from builder scripts.
6. Commit script generation stage including generating commit scripts for each component that has been modified and a script to run all generated commit scripts is generated.
7. Compile, assemble, and gather stage including compiling all components and assembling the compiled components into compressed elements or uncompressed elements. All elements are gathered into a compressed zip or folder for aggregation of all software application build output.
8. Installer preparation stage including moving/unpacking build output to an installer build folder. Download a JRE if not available and move to a staging area and cache. The cache provides a "between builds" cache to avoid multiple downloads of a same JRE since the JRE does not change often. The cache may be manually erased if a new JRE should be downloaded. Any installer specific information (including translation properties and versioning information) is updated.
9. Installer build stage including changing an installer output name to reflect building an installer. Run an installer build and move the generated installer to the output folder.
10. Updater build stage including change an installer output name to reflect building an updater. Delete any files/folder (i.e., that are not included with an update) from a staging area. Run an updater build and move the generated updater to an output folder.
11. MD5 checksum generation stage including generating MD5 checksums for both the installer and updater to allow verification of files when moved across a network.
12. Commit changes to SCR stage including using previously generated commit scripts and running all scripts to update the SCR with modifications to all build components.

System 5 of FIG. 1 comprises a computing device 8a connected through a network 7 to a computing system 10. Additionally, system 5 may comprise a computing device 8b directly connected to computing system 10. Network 7 may comprise any type of network including, inter alia, a local area network, (LAN), a wide area network (WAN), the Internet, etc. Computing device 8a and 8b may comprise any type of computing apparatus including, inter alia, a personal computer (PC), a laptop computer, a computer terminal, etc. Computing system 10 may comprise any type of computing system(s) including, inter alia, a personal computer (PC), a server computer, a database computer, etc. Computing system 10 is used to implement a process for automatically generating a software application. Computing system 10 comprises a memory system 14. Memory system 14 may comprise a single memory system. Alternatively, memory system 14 may comprise a plurality of memory systems. Memory system 14 comprises a versioning software application 18 and a database 12. Database 12 may comprise a source code repository including all components of a software application (e.g., features, plug-ins, packages, class files, etc). Additionally, database 12 may be used to store scripts and version information associated with features, plug-ins, packages, class files, etc.

System 5 enables a software application build process comprising compiling source code into binary code or other interpreted files, gathering the compiled files, and binding the compiled files into an executable file. Additionally, the software application build process comprises creating and running Java applications by providing an extensive plug-in framework that developers may use to create applications as a set of bundles that take advantage of a common set of services and infrastructure. Each bundle comprises additional metadata that an underlying framework may read and process. The metadata may include a version identifier (e.g., comprising a form: Major.Minor.Increment.Qualifier) requiring a major version. An output of the build process comprises an executable file with associated files and folders that make it easier for the user to configure and run (e.g., MyApp.exe). A set of associated plug-ins may be aggregated or bundled into a feature. A feature additionally includes version information in its metadata. A feature may include any number of plug-ins. A software application is built using a collection of features at specific version levels. Each of the features comprise plug-ins each comprising specific version levels. A resulting software application represents a collection of features and plug-ins. The software application comprises a version in its application metadata. The version metadata for the software application, features, and plug-ins is completely independent of any SCR versioning.

The following hierarchy represents an example of an Eclipse application with associated metadata version levels:
Application—1.1.1.20100101-1624
　Feature1—1.1.0-20100101-1620
　　Plugin1A—1.3.4-2010010-1620 package1A1
　　　Class1—SCR version 3 Class2—SCR version 5 package1A2
　　　Class3—SCR version 1
　　Plugin1B—1.2.2 package1B1
　　　Class4—SCR version 2 Class5—SCR version 5 Class6—SCR version 1 package 1B2
　　　Class7—SCR version 2
　Feature2—1.3.1
　　Plugin2A—1.3.4—with associated packages and classes
　　Plugin2B—1.3.3—with associated packages and classes Versioning software application 18 enables the following elements for building a software application:
1. Modify a generated software application fetch script to reroute an application feature to a separate holding area (e.g., a source directory) to allow editing and/or updating to the source code.
2. Copy application features and plug-ins to build a directory.
3. Modify the generated feature and plug-in fetch scripts for all software application components to reroute the component fetches to the source directory changing the SCR fetch type to allow for editing/updating the source code
4. Compare all source files with previous build SCR versions and add each changed element to a modified collection. Alternatively, the comparison may be eliminated and a specific version may be assigned to all components automatically adding all elements to the modified collection.
5. Iterate through the modified collection and increment version metadata in the source code for each changed plug-in. Additionally, the increment logic may be programmatically configured to insert a specific version rather than increment from a previous version.
6. Modify version metadata source code for each feature that includes at least one changed plug-in.

7. Update software application metadata.
8. Generate commit scripts for all updated elements to commit changes back to SCR when the software application build is completed.
9. Update installer builder program application metadata
10. Unzip/Move created build output to installer build folder (s).
11. Change install builder build output name (Installer or Updater).

Versioning software application 18 enables the following steps for modifying versions associated with features and plug-ins:

1. Using a map or other component list, checkout all requested components of the software application to be built from a source code management system (SCM). For a concurrent versioning system (CVS), an additional update of each component for each file is required to reset any "sticky" tags associated with a checkout from a specific branch. This step results in a source code build server that may be modified and checked back into the SCM.
2. Compare currently checked out source code for each component to a prior build version of a same component. Add any components that display changes to a list of changed components. Any changes may be tracked in a separate log for each component.
3. Enabling a component versioning process comprising iterating through a list of changed components. For each component, open and parse a file used to store the component version information. If a multi-layer versioning schema is used, a version tier incremented may depend on a type of build being performed. A 4 tier versioning schema (i.e., consisting of major, minor, increment, and qualifier) may be used. An example of a 4 tier version comprises: 1.2.3-200901020811 where major=1, minor=2, increment=3, and qualifier=20090102081. The qualifier may comprise a date 20090229 (yyyyMMdd) and time 2311 (hhmm). Depending on a type of build being performed, any one or all of the following versioning tiers may be modified during a single build for each affected component:
   A. Release or major builds—A major tier is incremented, a minor tier is set to "0", and any increment or qualifier information is deleted as follows:
   Prior version: 1.2.3-200812240811->new version: 2.0.0-200901031324.
   B. Minor builds—A major element remains the same and a minor tier is incremented as follows:
   Prior version: 1.2.3-200901020811->new version: 1.3.0-200901031324
   C. Incremental builds—An increment tier is changed as follows:
   Prior version: 1.2.3-200901020811->new version: 1.2.4-200901031324
   D. Nightly builds—A qualifier is set to a build timestamp as follows:
   Prior version: 1.2.3-200901020811->1.2.3-200901031324

A 4-tier build versioning schema provides a robust method of build tracking and is consistent with generally accepted application development practice. Additionally, any other supplemental file(s) that also carry version information are updated at this stage (e.g. about.mappings, about.properties, etc.).

4. Enabling a cluster versioning process comprising clustering components into features. For any features that encapsulate changed or newly versioned components, a feature version is incremented using the same strategy as above.
5. Upon successful completion of a software application build, changed/updated elements of each component are committed back to the SCM system.
6. Tag or identify the build components of this build as a unique collection within the SCM system so a comparison can be made during the next build.

The following implementation example describes a process for comparing various components of a software application and illustrating versioning changes:

In this implementation example, aggregation units may be different for different platforms. Each aggregation unit and component comprises a unique build version level (i.e., separate and distinct from application build version levels) that is separate and unique from any SCM system source versions. The software application (i.e., in this example) comprises 8 components and 3 aggregation levels. A plug-in framework specifies how versioning is represented for software applications inside aggregation units (e.g., features) and component units (e.g., plug-ins and fragments). The plug-in framework versioning implementation is completely separate and distinct from aSCM system versioning schema.

Application build version 1.2.3
    application version file, SCM version 1.121.2.8
    aggregation unit) build version 1.2.3.1, SCM version 1.123
        component) 1 version 1.3.4, SCM version—1.110 component12 version 1.1, SCM version—1.50 component13 version 2.3, SCM version—1.127
    aggregation unit2 version 2.5, SCM version—1.97 component21 version 1.1.6, SCM version—1.31 component22 version 2.3.5, SCM version—1.24
    aggregation unit3 version 1.1, SCM version—1.85 component31 version 1.0.8, SCM version—1.57 component32 version 1.1, SCM version—1.26 component33 version 3.5.6, SCM version—1.63

A comparison process illustrates (i.e., in bold) the following components have changed:

Application version 1.2.3 compared to prior build version 1.2.2 application
    version file—has not changed since the prior build
    aggregation unit1 version 1.2.3.1
        *component11 version 1.3.4—changed component11 version 1.1
        *component13 version 2.3—changed
    aggregation unit2 version 2.5 component21 version 1.1.6
        *component22 version 2.3.5—changed
    aggregation unit3 version 1.1
        component31 version 1.0.8
        component32 version 1.1
        component33 version 3.5.6

Therefore, for a nightly build, the following result is generated:

Application version 1.2.4-200909231708
    incremented to the next increment with nightly build timestamp
    application version file—changed
        holds the application incremented build version 1.2.4-200909231708,
        SCM version 1.121.2.8, but will change after commit
    aggregation unit) version 1.2.3.2
        incremented to next increment build level due to change in component) 1 and
        component13, independent of SCM version of 1.123
        component11 version 1.3.5
            incremented to the next increment build level, SCM version 1.110 component11 version 1.1
        component13 version 2.4 incremented to the next minor build level, SCM version 1.127
aggregation-unit2 version 2.6
incremented due to change in component22, SCM version 1.97component21 version 1.1.6
component22 version 2.3.6
incremented to the next increment build level, SCM version 1.24
aggregation unit3version 1.1 no change
component31 version 1.0.8 component32
version 1.1 component33 version 3.5.6

Only changed elements are committed back to the SCM system after the software application build is completed. The SCM assigns new SCM version levels to changed elements of all components independent of any other build version. In this case, the changed elements in bold above will receive updated SCM versions upon commit completely independent of the build versioning levels in bold above. When a build is completed, all elements changed and not changed are tagged in the SCM system so that a record is made of this specific build configuration. System 5 additionally comprises an ability to compare across multiple prior build levels. A single build may increment all elements that have changed since a build that was actually X builds ago. This results in a version for all elements that had changed in each of the X prior builds and include the changes since the last build. This type of build is used to manage a security or other important change that affected the current build. This process comprises a management of a collection of components and their relationship to a particular aggregation unit within an application scope so that when a component is flagged as changed, an enclosing aggregation unit is also flagged as changed and both will have their build versioning elements updated.

Figures 2, 2A:
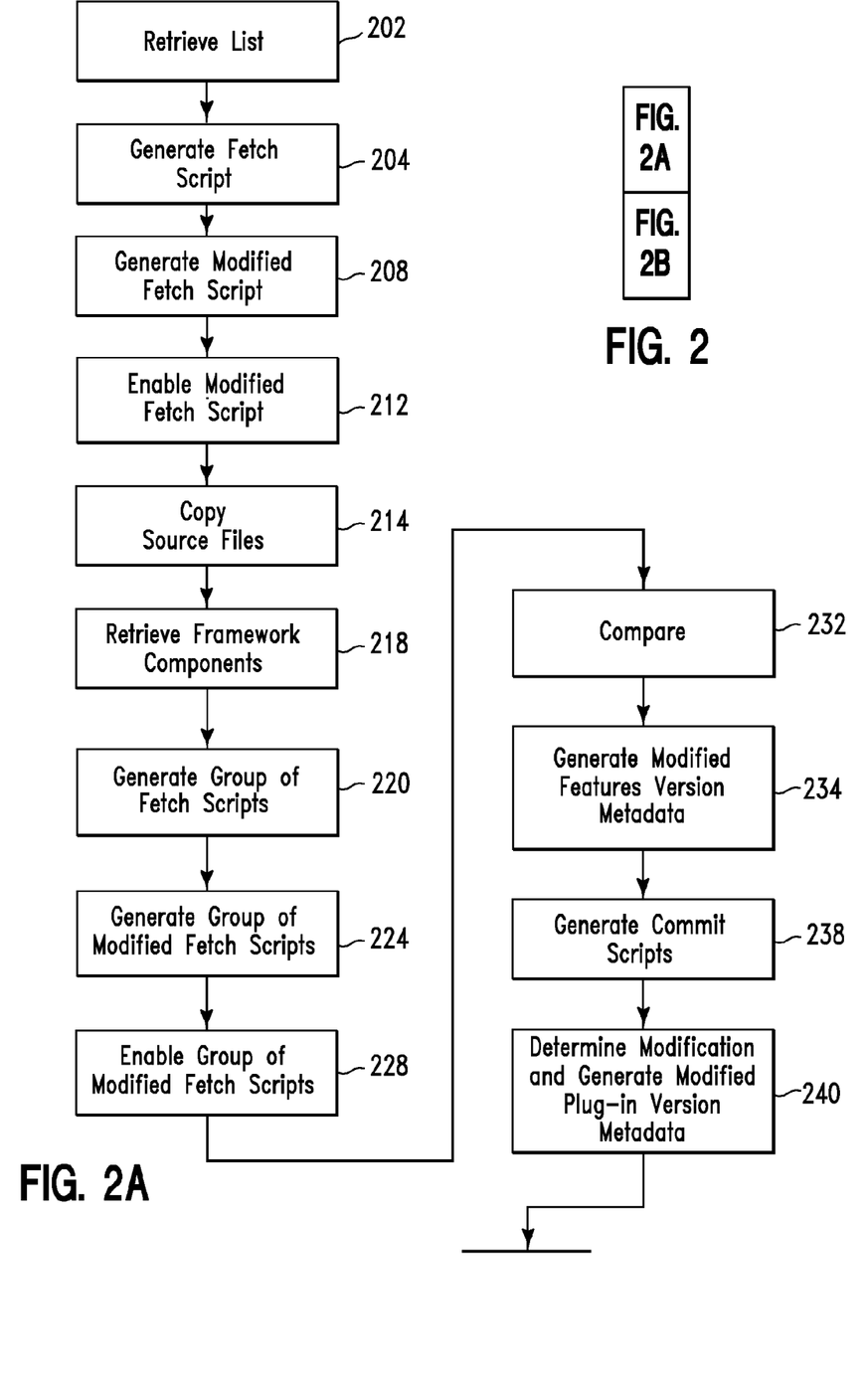
Figure 2B:
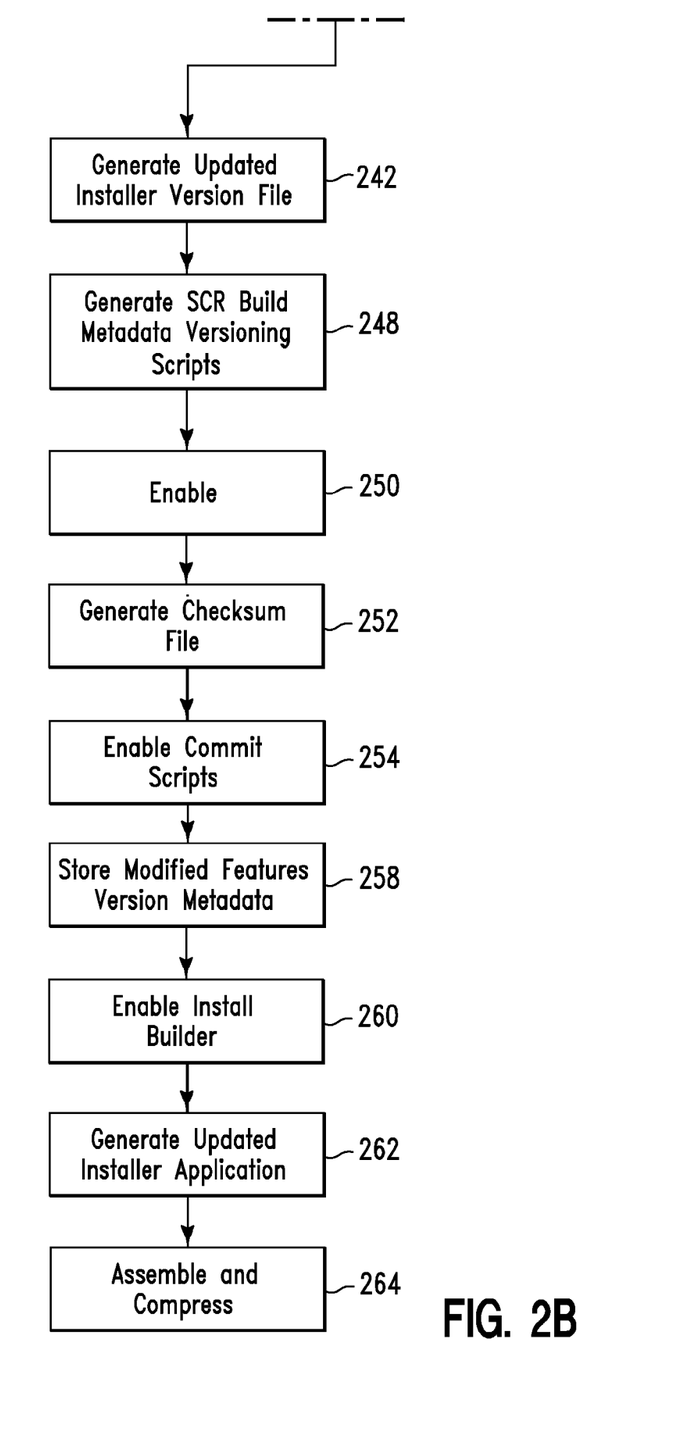

FIG. 2 including FIGS. 2A and 2B illustrates a flowchart describing an algorithm used by system 5 of FIG. 1 for automatically generating a software application and modifying versions associated with features and plug-ins of the software application, in accordance with embodiments of the present invention. In step 202, a computer processor of a computing system (e.g., computing system 10 of FIG. 1) retrieves a list of features and plug-ins associated with an (software) application. The features comprise features version metadata. The plug-ins comprise plug-ins version metadata. In step 204, the computer processor generates a fetch script for a first application feature of the list of features. In step 208, the computer processor generates a modified fetch script associated with the fetch script. The modified fetch script comprises instructions for rerouting first source files comprising the first application feature to a first source folder associated with a new directory and instructions allowing the first source files to be edited. In step 212, the computer processor enables the modified fetch script to retrieve the first source files. In step 214, the computer processor copies the source files to a build directory. In step 218, the computer processor retrieves framework components comprised by a framework associated with the application. In step 220, the computer processor generates a first group of fetch scripts associated with the framework components and the features from the list of features. In step 224, the computer processor generates a first group of modified fetch scripts associated with the first group of fetch scripts. The first group of modified fetch scripts comprise instructions for rerouting a group of source files comprising the features to the first source folder and instructions allowing the group of source files to be edited. In step 228, the computer processor enables the first group of modified fetch scripts to retrieve the group of source files. In step 232, the computer processor compares features source code (associated with the features) with previous versions of associated source code. In step 234, the computer processor generates (i.e., based on results of comparing the features source code) modified features version metadata associated with the features version metadata. The modified features version metadata comprises updated version labels differing from previous version labels of the previous versions of associated source code. In step 238, the computer processor generates commit scripts for a group of source code of the features source code. The group of source code comprises source code that differs from the associated source code. In step 240, the computer processor determines that first plug-ins (i.e., encapsulated by the first application feature) of the plug-ins have been modified and in response the computer processor generates modified plug-ins version metadata associated with the plug-ins version metadata. In step 242, the computer processor generates an updated installer version file based on the modified features version metadata. The updated installer version file is associated with an updated installer application. In step 248, the computer processor generates source code repository (SCR) build metadata versioning scripts associated with an SCR for the features. In step 250, the computer processor enables the updated installer version file and the SCR build versioning scripts. In step 252, the computer processor generates a checksum file comprising executable files associated with the features to be assembled into the application. In step 254, the computer processor enables the commit scripts. In step 258, the computer processor stores (i.e., within the SCR) the modified features version metadata. In step 264, the computer processor assembles the features into the application and places the features assembled into the application into a compressed file.

Figure 3:
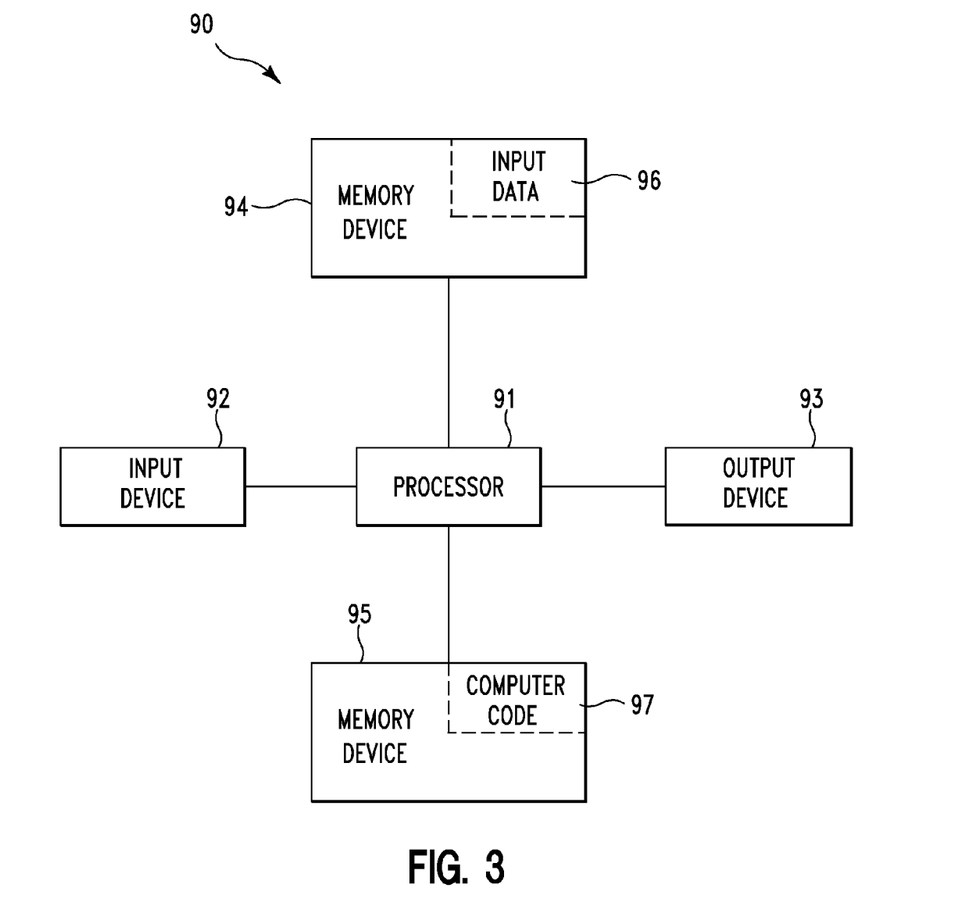
FIG. 3 illustrates a computer apparatus used for automatically generating a software application and modifying versions associated with features and plug-ins of the software application, in accordance with embodiments of the present invention.

FIG. 3 illustrates a computer apparatus 90 (e.g., computing system 10 of FIG. 1) used for automatically generating a software application and modifying versions associated with features and plug-ins of the software application, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for automatically generating a software application and modifying versions associated with features and plug-ins of the software application. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to automatically generate a software application and modify versions associated with features and plug-ins of the software application. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automatically generating a software application and modifying versions associated with features and plug-ins of the software application. In another embodiment, the invention provides a method that performs the process steps of the invention on a subscription, advertising, and/or fee basis. That is, a service provider, such as a Solution Integrator, could offer to automatically generate a software application and modify versions associated with features and plug-ins of the software application. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

retrieving, by a computer processor of a computing system, a list of features and plug-ins associated with an application, wherein said features comprise features version metadata, and wherein said plug-ins comprise plug-ins version metadata;

generating, by said computer processor, a first fetch script for a first application feature of said list of features;

generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;

enabling, by said computer processor, said first modified fetch script to retrieve said first source files;

copying, by said computer processor, said source files to a build directory;

retrieving, by said computer processor, framework components comprised by a framework associated with said application;

generating, by said computer processor, a first group of fetch scripts associated with said framework components and said features from said list of features;

generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;

enabling, by said computer processor, said first group of modified fetch scripts to retrieve said group of source files;

comparing, by said computer processor, features source code associated with said features with previous versions of associated source code;

generating, by said computer processor based on results of said comparing said features source code, modified features version metadata associated with said features version metadata, wherein said modified features version metadata comprises updated version labels differing from previous version labels of said previous versions of associated source code;

generating, by said computer processor, commit scripts for a group of source code of said features source code, wherein said group of source code comprises source code that differs from said associated source code;

assembling, by said computer processor, said features into said application; and placing, by said computer processor, said features assembled into said application into a compressed file.

2. The method of claim 1, further comprising:

determining, by said computer processor, that first plug-ins of said plug-ins have been modified, wherein said first plug-ins are encapsulated by said first application feature; and generating, by said computer processor in response to results of said determining, modified plug-ins version metadata associated with said plug-ins version metadata.

3. The method of claim 1, further comprising:

generating, by said computer processor, an updated installer version file based on said modified features version metadata, wherein said updated installer version file is associated with an updated installer application;

generating, by said computer processor, source code repository (SCR) build metadata versioning scripts associated with a SCR for said features;

enabling, by said computer processor, said updated installer version file and said SCR build versioning scripts;

generating, by said computer processor, a checksum file comprising executable files associated with said features assembled into said application;

enabling, by said computer processor, said commit scripts; and storing within said SCR, by said computer processor in response to said enabling said commit scripts, said modified features version metadata.

4. The method of claim 3, further comprising:

generating, by said computer processor based on results of said comparing said features source code, additional modified features version metadata associated with said modified features version metadata, wherein said additional modified features version metadata is associated with each feature of said features that comprises a different plug-in from plug-ins associated with previous versions of said features.

5. The method of claim 3, further comprising:
generating, by said computer processor, updated installer metadata associated with said updated installer application.

6. The method of claim 3, further comprising:
enabling, by said computer processor, an install builder; and
generating, by said computer processor in response to said enabling said install builder, said updated installer application.

7. The method of claim 1, further comprising:
decompressing, by said computer processor, said compressed file.

8. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

9. A computing system comprising a computer processor coupled to a computer-readable memory unit, said memory unit comprising instructions that when enabled by the computer processor implement a modification method, said method comprising:
retrieving, by said computer processor, a list of features and plug-ins associated with an application, wherein said features comprise features version metadata, and wherein said plug-ins comprise plug-ins version metadata;
generating, by said computer processor, a first fetch script for a first application feature of said list of features;
generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;
enabling, by said computer processor, said first modified fetch script to retrieve said first source files;
copying, by said computer processor, said source files to a build directory;
retrieving, by said computer processor, framework components comprised by a framework associated with said application;
generating, by said computer processor, a first group of fetch scripts associated with said framework components and said features from said list of features;
generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;
enabling, by said computer processor, said first group of modified fetch scripts to retrieve said group of source files;
comparing, by said computer processor, features source code associated with said features with previous versions of associated source code;
generating, by said computer processor based on results of said comparing said features source code, modified features version metadata associated with said features version metadata, wherein said modified features version metadata comprises updated version labels differing from previous version labels of said previous versions of associated source code;
generating, by said computer processor, commit scripts for a group of source code of said features source code, wherein said group of source code comprises source code that differs from said associated source code;
assembling, by said computer processor, said features into said application; and
placing, by said computer processor, said features assembled into said application into a compressed file.

10. The computing system of claim 9, wherein said method further comprises:
determining, by said computer processor, that first plug-ins of said plug-ins have been modified, wherein said first plug-ins are encapsulated by said first application feature; and
generating, by said computer processor in response to results of said determining, modified plug-ins version metadata associated with said plug-ins version metadata.

11. The computing system of claim 9, wherein said method further comprises:
generating, by said computer processor, an updated installer version file based on said modified features version metadata, wherein said updated installer version file is associated with an updated installer application;
generating, by said computer processor, source code repository (SCR) build metadata versioning scripts associated with a SCR for said features;
enabling, by said computer processor, said updated installer version file and said SCR build versioning scripts;
generating, by said computer processor, a checksum file comprising executable files associated with said features assembled into said application;
enabling, by said computer processor, said commit scripts; and
storing within said SCR, by said computer processor in response to said enabling said commit scripts, said modified features version metadata.

12. The computing system of claim 11, wherein said method further comprises:
generating, by said computer processor based on results of said comparing said features source code, additional modified features version metadata associated with said modified features version metadata, wherein said additional modified features version metadata is associated with each feature of said features that comprises a different plug-in from plug-ins associated with previous versions of said features.

13. The computing system of claim 11, wherein said method further comprises:
generating, by said computer processor, updated installer metadata associated with said updated installer application.

14. The computing system of claim 11, wherein said method further comprises:
enabling, by said computer processor, an install builder; and
generating, by said computer processor in response to said enabling said install builder, said updated installer application.

15. A computer program product, comprising a non-transitory computer readable medium comprising a computer readable program code embodied therein, said computer readable program code adapted to implement a modification method within a computing system comprising a computer processor, said method comprising:

retrieving, by said computer processor, a list of features and plug-ins associated with an application, wherein said features comprise features version metadata, and wherein said plug-ins comprise plug-ins version metadata;

generating, by said computer processor, a first fetch script for a first application feature of said list of features;

generating, by said computer processor, a first modified fetch script associated with said first fetch script, wherein said first modified fetch script comprises instructions for rerouting first source files comprising said first application feature to a first source folder associated with a new directory and instructions allowing said first source files to be edited;

enabling, by said computer processor, said first modified fetch script to retrieve said first source files;

copying, by said computer processor, said source files to a build directory;

retrieving, by said computer processor, framework components comprised by a framework associated with said application;

generating, by said computer processor, a first group of fetch scripts associated with said framework components and said features from said list of features;

generating, by said computer processor, a first group of modified fetch scripts associated with said first group of fetch scripts, wherein said first group of modified fetch scripts comprise instructions for rerouting a group of source files comprising said features to said first source folder and instructions allowing said group of source files to be edited;

enabling, by said computer processor, said first group of modified fetch scripts to retrieve said group of source files;

comparing, by said computer processor, features source code associated with said features with previous versions of associated source code;

generating, by said computer processor based on results of said comparing said features source code, modified features version metadata associated with said features version metadata, wherein said modified features version metadata comprises updated version labels differing from previous version labels of said previous versions of associated source code;

generating, by said computer processor, commit scripts for a group of source code of said features source code, wherein said group of source code comprises source code that differs from said associated source code;

assembling, by said computer processor, said features into said application; and placing, by said computer processor, said features assembled into said application into a compressed file.

16. The computer program product of claim 15, wherein said method further comprises:

determining, by said computer processor, that first plug-ins of said plug-ins have been modified, wherein said first plug-ins are encapsulated by said first application feature; and generating, by said computer processor in response to results of said determining, modified plug-ins version metadata associated with said plug-ins version metadata.

17. The computer program product of claim 15, wherein said method further comprises:

generating, by said computer processor, an updated installer version file based on said modified features version metadata, wherein said updated installer version file is associated with an updated installer application;

generating, by said computer processor, source code repository (SCR) build metadata versioning scripts associated with a SCR for said features;

enabling, by said computer processor, said updated installer version file and said SCR build versioning scripts;

generating, by said computer processor, a checksum file comprising executable files associated with said features assembled into said application;

enabling, by said computer processor, said commit scripts; and storing within said SCR, by said computer processor in response to said enabling said commit scripts, said modified features version metadata.

18. The computer program product of claim 17, wherein said method further comprises:

generating, by said computer processor based on results of said comparing said features source code, additional modified features version metadata associated with said modified features version metadata, wherein said additional modified features version metadata is associated with each feature of said features that comprises a different plug-in from plug-ins associated with previous versions of said features.

19. The computer program product of claim 17, wherein said method further comprises:

generating, by said computer processor, updated installer metadata associated with said updated installer application.

20. The computer program product of claim 17, wherein said method further comprises:

enabling, by said computer processor, an install builder; and generating, by said computer processor in response to said enabling said install builder, said updated installer application.

* * * * *